United States Patent Office 3,321,142
Patented May 23, 1967

3,321,142
METHOD FOR THE PRODUCTION OF AN ABRASION-RESISTANT DISCOLORATION-FREE CAFFEINE GRANULATE
Helmut Krahnefeld, Radebeul, Germany, assignor to Veb Arzneimittelwerk Dresden, Radebeul, Germany
No Drawing. Filed Aug. 19, 1965, Ser. No. 481,113
7 Claims. (Cl. 241—16)

This invention relates to a new and improved process for the production of an abrasion-resistant caffeine granulate without causing discoloration during the process. In a particular aspect the invention is concerned with the preparation of caffeine granules having a desired grain size and which are highly abrasion resistant and without discoloration. These granulates are of great importance for the preparation of mixed preparations in the pharmaceutical industry.

In the production of such pharmaceutical mixtures there has been a great demand for some time for caffeine in granular form because of its pourability which permits easy control of the dose added. Granulated caffeine, in contrast to caffeine which is obtained by crystallization from water or organic solvents, can also be relatively easily provided with a protective coating so that it dissolves only in the gastrointestinal tract.

Caffeine granules have heretofore been prepared by compression of crystalline or powdered caffeine, obtained by crystallization from water or organic solvents with subsequent grinding to the desired grain size. Such a granule, however, is not sufficiently abrasion-resistant because the water contained in the crystals, or other solvents, when used, burst the crystal surface on drying, so that the granule is loosened. A caffeine obtained by spray drying shows the same disadvantages on granulation.

This invention has for an object the provision of an improved process which is free of the above mentioned shortcomings. It is a further object to provide a process which permits to obtain caffeine granules of desired size and improved abrasion-resistance. Other objects and advantages of the process according to the invention will become apparent from the following detailed description.

In accordance with the invention, the above objects are attained by heating caffeine above its melting point in the presence of a reducing agent. The reducing agent has the purpose of counteracting yellow discoloration easily occurring in molten caffeine. The reducing agent should not react with caffeine and should be volatile at least at the melting temperature so that the product obtained is free of accompanying substances and needs no further purification.

The addition of the reducing agent to the caffeine may occur before or during the melting. The caffeine product obtained is then cooled and ground to the desired grain size by mechanical means.

Particularly suitable reducing agents for this purpose are aqueous solutions of hydrazines, but other volatile reducing substances e.g. formaldehyde, can also be used. These reducing agents can be employed as a solution in water or organic solvents, or in gaseous form. The required amount of the reducing agent is small, it is preferably between 0.01 and 10 mol percent and varies depending on the reducing agent used. When using Hydrezine, for example, 1 mol percent is sufficient.

For larger batches it may be expedient to enhance the above-described reducing effect by introducing nitrogen or other inert gases.

The discoloration of the molten substance, which without application of the reducing agents mentioned already occurs during the melting process can be avoided, even over a longer period of time, if these reducing agents are applied. If small amounts of the reagents mentioned are constantly added, caffeine, for instance, can be held in a fluid condition at 240° for 60 minutes without discoloration. Decisive for the time is the dwell time of the reducing agent in the melt.

For technical plants it is expedient to let the caffeine melt in a suitable apparatus in such a manner that a relatively small but intensively operating an electric heater is placed under a cooled feeding zone filled with caffeine. Caffeine sublimated in the melting zone precipitates in the cooled feeding zone filled with caffeine and cannot reach the surrounding air. Such an arrangement permits a continuous mode of operations and, by the substance constantly slipping down in the feeding zone, simultaneously prevents losses of gaseous reducing agents, as these are adsorbed by the great thickness of the layer of feeding material. Even an increase of the temperature above the melting point (with caffeine, for instance, to 280° C.) has no negative effect on the quality of the solidified product in cases where the reducing agents are present.

The further processing of the molten mass can either be carried out by spraying the liquid substance in a suitable apparatus, resulting in the formation of a spherical granulate, or by congealing of the molten mass, for instance, on a continuous cooling belt, and by comminuting the mass to form a granular product.

Another advantage of the caffeine granulate obtained by melting, is its reduced tendency to form agglomerations and lumps. Besides, the rate of dissolution of the caffeine granulate, obtained according to the invention, in water having a temperature of 25° C. is about two to three times greater than that of the commercial product of equal grain size.

In order that the present invention may be readily appreciated by and fully available to those skilled in the art the following illustrative but not limitative example of the preparation of the caffeine granules is supplied hereinbelow.

Example 1

1 kg. of caffeine is mixed with 20 ml. of a 25% aqueous hydrazine solution and melted in a vessel by heating to 240° C. The sublimation of the caffeine is suppressed carefully by the usual known methods. The molten product is then cooled, ground, and sifted; the individual fractions yield a granulated white product which corresponds in every respect to the quality of the starting product.

Example 2

1 kg. of caffeine is treated with 10 cm.$^3$ of a 25% aqueous formic acid, well mixed and then melted by heating up to 240–250°.

One allows the clear colorless melt to cool down, reduces the hard fused mass by one of the customary methods and, after sizing, obtains a caffeine granulate, the purity of which is in accordance with that of the initial product.

Example 3

1 kg. of caffeine is treated with 15 cm.$^3$ of a mixture of 60% by volume ethyl alcohol and 40% by volume highly concentrated (93%) formic acid and mixed well.

This mixture is melted by heating up to 240–250° and the fused mass is processed as described in Example 2.

The purity of the granulate obtained is in accordance with that of the caffeine used (quality USP 16).

What I claim is:
1. A method for the production of an abrasion-resistant discoloration-free caffeine granulate from caffeine, which comprises heating the caffeine above its melting point in the presence of a reducing agent which is chemically inert to caffeine, and subsequently grinding the caffeine product obtained, after cooling, to the desired grain size by mechanical means.

2. A method of claim 1 wherein said reducing agent is a compound selected from the group consisting of aqueous hydrazines and formaldehyde.

3. A method according to claim 1 which comprises using 0.01 to 10 mol percent of the reducing agent calculated on the caffeine.

4. A method according to claim 1 which comprises adding the reducing agent in solution.

5. A method according to claim 4 which comprises using a solvent selected from the group consisting of water and inert organic solvents for the reducing agents.

6. A method according to claim 1 which comprises introducing an inert gas to enhance the reducing effect of the reducing agent.

7. A method for the production of an abrasion-resistant discoloration-free caffeine granulate from caffeine, which comprises heating the caffeine above its melting point in the presence of 0.01 to 10 mol percent of a reducing agent, said reducing agent being chemically inert to caffeine and selected from the group consisting of aqueous hydrazines and formaldehyde in a solvent selected from the group consisting of water and inert organic solvents, and introducing an inert gas to enhance the reducing effect of the reducing agent, and subsequently reducing the caffeine product as obtained after cooling, to the desired grain size by mechanical means.

References Cited by the Examiner

UNITED STATES PATENTS 3,067,956  12/1962  Tove _____ 241—23 X

WILLIAM W. DYER, JR., *Primary Examiner.*

H. F. PEPPER, JR., *Assistant Examiner.*